Sept. 14, 1965  R. D. MOORE  3,205,861
FEED SAVER HORSE FEEDING DEVICE
Filed Jan. 2, 1964  2 Sheets-Sheet 1
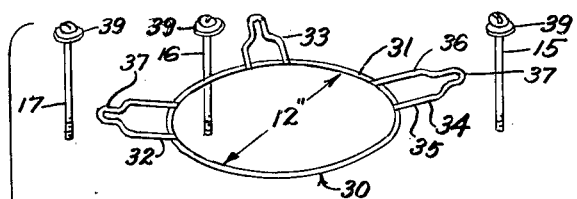
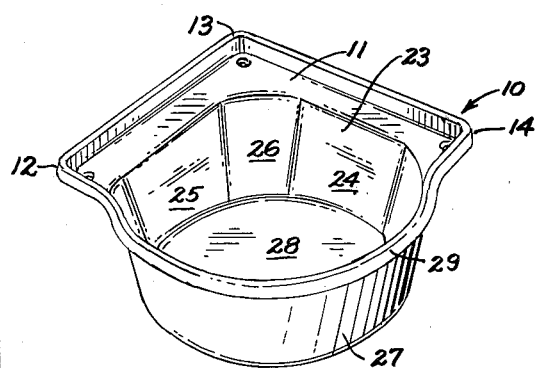
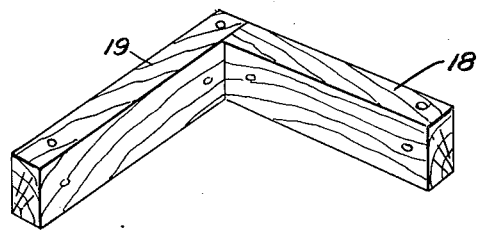
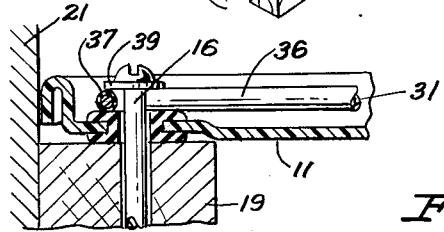
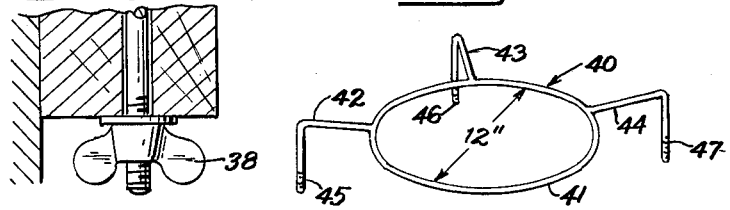
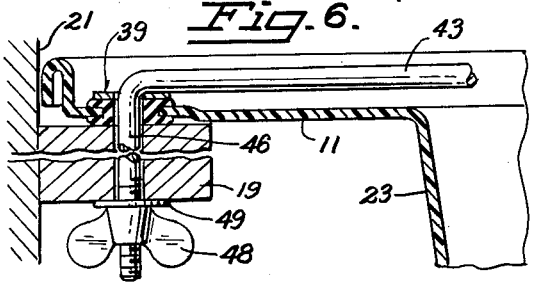
INVENTOR.
ROBERT D. MOORE
BY
Owen, Wickersham & Erickson
ATTORNEYS Sept. 14, 1965   R. D. MOORE   3,205,861
FEED SAVER HORSE FEEDING DEVICE
Filed Jan. 2, 1964   2 Sheets-Sheet 2

INVENTOR
ROBERT D. MOORE
BY
ATTORNEY

United States Patent Office 3,205,861
Patented Sept. 14, 1965

3,205,861
FEED SAVER HORSE FEEDING DEVICE
Robert D. Moore, Los Angeles, Calif., assignor to Carnation Company, Los Angeles, Calif., a corporation of Delaware
Filed Jan. 2, 1964, Ser. No. 335,244
7 Claims. (Cl. 119—61)

This invention relates to animal feeding, with particular reference to the feeding of horses in their stalls.

A horse typically wastes ten to twenty percent of its feed by reason of its eating habits. It pushes some of its feed out of its feed trough onto the ground and moves some of it to other places where it cannot be recovered. A purpose of the present invention is to provide a device which curtails the wasteful eating habits of the horse, positively prevents it from exercising its normal bad habits, and forces it to eat in a way that is more economical of its feed. Thus, it saves money by saving approximately the amount of feed that would otherwise be wasted. At the same time, it causes the horse to eat more slowly, and slower eating helps to benefit the horse's digestion and general well being.

When such attempts have been made heretofore, they have usually employed metal plates or flat rings, but these were not satisfactory because they caused other problems. The flat rings tended to cut the animal and sometimes discouraged it from eating as much as it should eat. The flat plates prevented adequate circulation of air around the food, so that spoilage of the food increased, resulting in as much as or more waste than was ordinary. These devices also got in the way and prevented good cleaning of the trough or feed tub. There tended to be hidden pockets and overlaps where old feed could collect and where bacteria, spoilage, flies, and so on could act on it, so that the horse was discouraged from eating and tended not to get enough to eat. Other devices have tended to be dented and torn up, cut, and otherwise damaged, as well as being difficult to clean. There have also been problems with feed material becoming coated on such devices, tending to cause rust or tending to spoil and give rise to unpleasant smells which discourage the horse from eating.

It is important to obtain proper anchorage of the food saving apparatus to the feeding tub or trough, so that it cannot be misshaped, torn apart, torn off, or misused by the horse and so that it cannot either hurt the horse or fail to do its job adequately.

Further, many horses have a nervous habit of chewing on their feed trough, known as "cribbing," which tends to destroy the trough and to injure the horse.

The present invention has the object of overcoming these problems and bringing about the desired savings in feed and the desired slow-down in the horse's eating (thereby aiding its digestion) without causing other problems, such as those which have been heretofore caused when similar attempts have been made. The invention also prevents the horse from cribbing and thereby protects both the horse and the feed tub.

Other objects and advantages of the invention will appear from the following description of some preferred embodiments thereof.

In the drawings:

FIG. 1 is an exploded view in perspective of a feed tub and feed-saver ring combination embodying the principles of the invention and about to be installed in the corner of a horse's stall.

FIG. 4 is an enlarged fragmentary view in section taken along the line 4—4 in FIG. 2.

FIG. 5 is a view in perspective on the scale of FIG. 1 of a modified form of feed saver ring also embodying the invention.

FIG. 6 is a view similar to FIG. 4 showing the installation of the modified form of ring.

Figure 2:
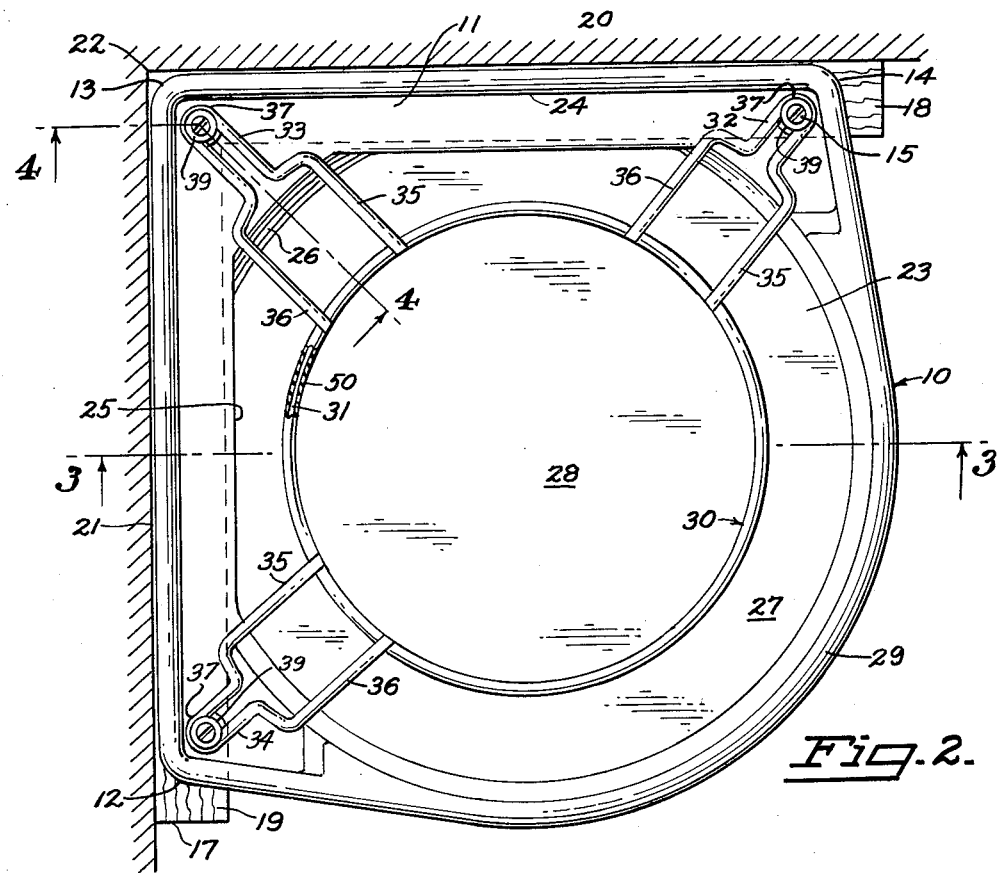
FIG. 2 is an enlarged top plan view of the installed tub-ring combination of FIG. 1. A portion of the plastic covering of the ring is broken away and shown in section.

The invention will be described in conjunction with the use of horse feeding tubs and particularly with a tub 10 of the general type shown in the Noble Van Voorhis patent, Des. 193,654, although the actual design is different. The tub 10 is a unitary molded plastic article provided with an upper flange 11 having three corners 12, 13, 14 near each of which fasteners such as bolts 15, 16, 17 may be used to secure it to a pair of converging two-by-fours 18 and 19, that are bolted to the walls 20 and 21 in a corner 22 of the horse's stall at a proper elevation for the horse to eat comfortably. The tub 10 has a generally cylindrical or slightly tapered receptacle 23, in which the feed is put. The receptacle 23 is generally circular but with vertical flat walls 24 and 25 meeting at an inner curved corner 26 and by a generally vertical, slightly tapered curved wall 27, and it has a flat bottom wall 28. When feed is put into the tub 10, the square corner 13 keeps feed from spilling out between the tub 10 and the walls 20 and 21, but, due to its usual sloppy eating habits, the horse tends to force feed over the lip 29 at the outer edge of the tub, and, as the horse turns its head, this tendency would ordinarily result in wasting the feed.

Figure 3:
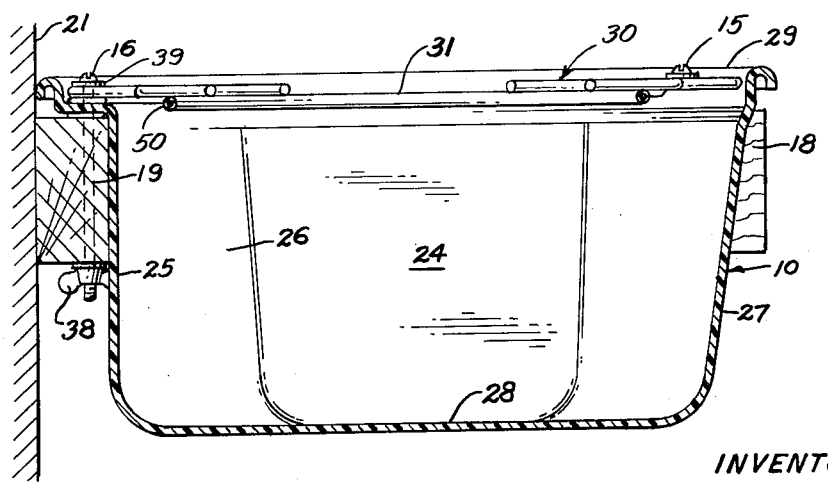
FIG. 3 is a view in elevation and section taken along the line 3—3 in FIG. 2.

However, in the form of this invention shown in FIGS. 1-4, I employ a feed saver ring unit 30 which is provided with a round ring 31 of plastic-coated wire, preferably number 1 gauge, about one-quarter inch in thickness, or somewhat heavier. In order to center the ring 31 concentrically with the tub receptacle 23 at its upper level, three anchoring devices 32, 33, and 34 extend from the ring 31, each comprising a pair of generally radially outwardly extending wires 35 and 36, usually about two inches apart to strengthen the unit, meeting at an end portion with a 180° loop or bend 37 at their outer ends, where the bolts 15, 16, and 17 are anchored, nuts 38 and washers 39 being used to hold the tub 10 and ring 30 in place.

In another form of the invention shown in FIGS. 5 and 6, the bolts 15, 16, and 17 are omitted, and a modified ring assembly 40 is provided with a round ring 41 like the ring 31 and three radially outwardly extending wire arms 42, 43, and 44 bent to provide downwardly extending threaded vertical studs 45, 46, 47, which extend through the openings in the tub 10 and through drilled openings in the two-by-fours 18 and 19 and may be secured in place by wing nuts 48 and washers 49.

In both cases, the entire ring 31 or 41 and preferably also the horizontal portions 32, 33, and 34 or 42, 43, and 44 of the wire are coated with a plastic coating 50, so that there is no metal surface for the horse to come into contact with. The tub 10 itself is also preferably of plastic. The plastic coating 50 keeps the temperature of the ring 31 or 41 even, so that the horse's tender nose does not feel a hot or cold metal ring. It also smooths rough edges that may be on the metal and that might tend to cut the horse or to frighten it.

The ring 31 or 41, it will be noted, enables air to circulate freely around it and into the tub receptacle 34 almost the same as though the ring device 30 or 40 were not there. The ring device 30 or 40 does not get in the way of cleaning and is easily removed when that is desirable, but it need not usually be removed. It is clean and simple, too firm and strong for the horses to distort, and not unpleasant to their touch, so that it does not discourage them from eating, merely slowing them down (which in nervous horses is quite desirable), especially since there is plenty of air circulation and no place where spoiled feed can collect if the tub 10 is kept clean by the normal procedures. Thus, the feed will not spoil nor will it be wasted.

The size of the ring 31 or 41 is quite important. I have found that a ten-inch diameter ring is too small and that with a thirteen-inch diameter feed is wasted. Approximately twelve inches appears to be ideal, though it may vary from about eleven to twelve and one-half inches. The tub 10 is typically 17–18 inches wide but may be wider. This diameter of ring 31 or 41 both prevents the wasting of the feed and gives the horse adequate entrance to this feed. The diameter of the ring is small enough so that the horse must exercise some care in putting its nose in; therefore it puts its nose in slowly, and this helps to slow its eating.

Thus the ring 30 or 40 not only prevents the horse from eating too rapidly and with excessive motion and from pushing its feed out of the tub 10 but also provides adequate circulation, removability, and does not interfere with the cleaning. It is adjustable for height, as can be seen, to take care of individual differences. Moreover, the ring 30 or 40 appears to serve as a positive deterrent to "cribbing" i.e., nervous chewing on the feed tub 10 itself. The ring 30 or 40 thus protects the tub 10 while also reinforcing it.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A horse feeding device, including in combination a feed tub having a generally cylindrical receptacle having side walls and an annular top surface and having a flange on its upper edge providing a square corner and three anchoring points by which said tub is mounted to the wall of a horse stall, and
a feed saver ring comprising a circular ring of round metal wire covered with a plastic coating and spaced away from said side walls, from said top surface and from said flange and having three outwardly extending anchoring portions extending to said three anchoring points and anchored thereat to said tub, said ring being approximately on a level with said flange and centered with respect to said tub receptacle.

2. The feeding device of claim 1 wherein said three anchoring portions comprise radially outwardly extending wires each having at its outer end a vertical bent-down portion having a threaded lower end for securing both said ring to said tub and said tub to a mounting base in a horse stall.

3. The feeding device of claim 1 wherein said three anchoring portions each comprise a radially outwardly extending wire bent double at its outer extremity and welded to the upper surface of said circular ring, so that said ring is lower than said anchoring portions.

4. The feeding device of claim 1 wherein said generally cylindrical receptacle has two mutually perpendicular flat vertical walls joined by a short radius corner and by a larger radius outer circular tapering portion, said flange being on its upper edge along and above said vertical walls to provide said square corner and to provide linear edges leading therefrom and adapted to lie snugly against the wall of a horse's stall at a corner thereof.

5. The feeding device of claim 1 wherein said generally cylindrical receptacle is from sixteen to twenty inches in diameter and said ring is from eleven to twelve and one-half inches in diameter.

6. The feeding device of claim 1 wherein there is a peripheral lip all around the upper edge of said tub at a level above said flange.

7. The feeding device of claim 6 wherein said lip has a vertically turned down terminal portion.

References Cited by the Examiner
UNITED STATES PATENTS

| | | | |
|---|---|---|---|
| 150,423 | 5/74 | Link et al. | 119—61 |
| 1,042,115 | 10/12 | Hoffman | 119—61 |
| 1,329,288 | 1/20 | Carpenter | 119—61 |
| 1,435,404 | 11/22 | Lloyd | 119—61 |

SAMUEL KOREN, *Primary Examiner.*

ALDRICH F. MEDBERY, *Examiner.*